United States Patent
Aslan

(10) Patent No.: US 7,333,038 B1
(45) Date of Patent: Feb. 19, 2008

(54) ELIMINATING THE EFFECTS OF THE TEMPERATURE COEFFICIENTS OF SERIES RESISTANCE ON TEMPERATURE SENSORS

(75) Inventor: Mehmet Aslan, Sunnyvale, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 52 days.

(21) Appl. No.: 11/368,135

(22) Filed: Mar. 2, 2006

Related U.S. Application Data

(60) Provisional application No. 60/729,452, filed on Oct. 21, 2005.

(51) Int. Cl.
*H03M 1/10* (2006.01)
(52) U.S. Cl. .............. 341/120; 341/118; 341/139; 341/155; 374/178; 374/183
(58) Field of Classification Search ........... 374/178, 374/183
See application file for complete search history.

(56) References Cited

U.S. PATENT DOCUMENTS

| | | | |
|---|---|---|---|
| 5,149,637 A | * | 9/1992 | Scandella et al. .......... 435/69.6 |
| 6,480,127 B1 | * | 11/2002 | Aslan .......................... 341/119 |
| 6,637,934 B1 | * | 10/2003 | Henderson et al. .......... 374/178 |
| 6,808,307 B1 | * | 10/2004 | Aslan et al. ................. 374/178 |
| 7,089,146 B1 | * | 8/2006 | D'Aquino et al. ........... 702/132 |
| 7,140,767 B2 | * | 11/2006 | McLeod et al. ............. 374/178 |
| 2004/0071183 A1 | * | 4/2004 | Tesi et al. ........................ 374/1 |
| 2006/0193370 A1 | | 8/2006 | St. Pierre et al. ............ 320/162 |

\* cited by examiner

*Primary Examiner*—Khai M. Nguyen

(57) ABSTRACT

An embodiment of the present invention is directed to a method for reducing the effects of temperature coefficients of series resistance in a temperature sensing circuit having a temperature sensing element. The currents through the temperature sensing element are relatively constant over temperature. The method includes adjusting the gain of an analog to digital converter to compensate for the change in current densities in the temperature sensing element multiplied by a characterized temperature coefficient of the series resistance of a signal path of the temperature sensing circuit. The method also includes adjusting an offset of the analog to digital converter to compensate for the change in current densities in the temperature sensing element multiplied by a characterized resistance of the signal path of the temperature sensing circuit.

21 Claims, 4 Drawing Sheets

300

```
┌─────────┐
│  Begin  │
└────┬────┘
     ▼
┌──────────────────────┐
│ Characterize R and α │
│ as shown in appendices│
│         310          │
└──────────┬───────────┘
           ▼
┌──────────────────────┐
│ Select a current     │
│ source having a      │
│ particular           │
│ temperature coefficient│
│         320          │
└──────────┬───────────┘
           ▼
┌──────────────────────┐
│ Select ΔI_E so that γ = 0│
│         330          │
└──────────┬───────────┘
           ▼
┌──────────────────────┐
│ Adjust ADC offset to │
│ compensate for R × ΔI_E│
│         340          │
└──────────┬───────────┘
           ▼
┌─────────┐
│   End   │
└─────────┘
```

Figure 3

ELIMINATING THE EFFECTS OF THE TEMPERATURE COEFFICIENTS OF SERIES RESISTANCE ON TEMPERATURE SENSORS

CLAIM OF PRIORITY UNDER 35 U.S.C. § 119

The present application for patent claims priority to Provisional Application No. 60/729,452 entitled "ELIMINATING THE EFFECTS OF TEMPERATURE COEFFICIENTS OF SERIES RESISTORS ON TEMPERATURE SENSORS" filed Oct. 21, 2005, and assigned to the assignee hereof and hereby expressly incorporated by reference herein.

BACKGROUND

1. Field

This invention generally relates to the field of temperature sensors in integrated circuits.

2. Background

When temperature is measured in an integrated circuit, a semiconductor junction is often used in the process. By manipulating the currents and the current densities through the junction, changes in voltage can be measured across the junction. A change in voltage at two current densities across the junction can be measured and used by a temperature sensor to calculate temperature. Most junctions employed for this purpose are parasitic vertical p-n-p silicon based transistors. However, it should be appreciated that n-p-n transistors or even diodes may be used instead.

The classic transistor equation determines a change in the base emitter voltage ($\Delta V_{BE}$) for a p-n-p transistor as follows:

$$\Delta Vbe = \eta \frac{\kappa T}{q} \ln\left(\frac{I_{CN}}{I_{C1}}\right) \quad (1)$$

where η is a non-ideality constant substantially equivalent to 1.00 or slightly more/less, κ is the well known Boltzmann's constant, q is the electron charge, T is the temperature in Kelvin, $I_{C1}$ and $I_{CN}$ are collector currents that are present at the measurement of a first base-emitter voltage and a second base-emitter voltage respectively.

There are two basic types of temperature sensors that utilize the concept of the diode equation: "diode mode" sensors and "transistor mode" sensors. Diode mode sensors operate on the assumption that a ratio of collector currents tends to be relatively equivalent to a ratio of known emitter currents ($I_E$). Hence, for a diode mode sensor, the diode approximation of the transistor equation (or "diode equation" for short) is approximated by:

$$\Delta Vbe = \eta \frac{\kappa T}{q} \ln\left(\frac{I_{EN}}{I_{E1}}\right); \text{ where } \frac{I_{C1}}{I_{C2}} = \frac{I_{E1}}{I_{E2}} \quad (2)$$

As process geometries have decreased, the beta (ratio of collector current over base current) has been shown to vary as much as ten percent or more between two known emitter currents for p-n-p transistors. Transistor mode sensors, which utilize TruTherm™ technology invented by National Semiconductor, have evolved as a consequence. Transistor mode sensors do not operate on the assumption that collector current is equivalent to emitter current. Therefore, they will either measure the actual collector currents directly or they will employ a feedback circuit to drive the collector currents to a known ratio. As a result, transistor mode sensors use the transistor equation shown in Equation 1. Examples of the TruTherm™ invention, methods, and techniques can be found in U.S. patent application Ser. No. 10/865,609, filed Jun. 9, 2004, by Mehmet Aslan, entitled "BETA VARIATION CANCELLATION IN TEMPERATURE SENSOR," hereinafter referred to as the "TruTherm™ application," which is hereby incorporated by reference herein in its entirety.

In both diode mode and transistor mode sensors, a problem arises in measuring the voltage across the junction, because the actual voltage across the junction is never measured due to the fact that error terms are introduced by series resistances in the measurement path to and from the junction. The exemplary circuit diagram of FIG. 1 illustrates one temperature measuring circuit that experiences this problem of measurement-induced error. In FIG. 1, a temperature sensor supplies a current to the emitter of a PNP transistor, and then receives an input current from the base of the same transistor. A base-emitter voltage is generated across the base-emitter junction of the transistor. However, due to the series resistance of the measurement lines, the temperature sensor actually measures a slightly different voltage than what is present across the base-emitter junction of the transistor. The series resistance is represented by resistor $R_E$ in series between the temperature sensor and the emitter of the PNP transistor and resistor $R_B$ in series between the base of the PNP transistor and the temperature sensor. The presence of these series resistances introduces error.

In the past, especially in integrated circuit production techniques at the 0.09 micron level and larger, this type of measurement-induced error could be ignored by a temperature sensor because accuracy needs were not as stringent. However, at smaller circuit production techniques, this error becomes larger and must be dealt with. A typical way to deal with this was generally to add an offset—either a resistance offset, a temperature offset, or a software offset that helps compensate for the error that is induced by the measurement. In one case, the amount of offset would be determined by simply multiplying a typical resistance of the circuit by a typical current through the circuit. In another case, the amount of offset would be determined by multiplying a typical resistance by the actual current. In either case, the offset only works in conditions where the error term has no significant temperature dependency. In the past, there was only a very small temperature dependency in the measurement errors. However, at smaller integrated circuit sizes, starting at around 65 nanometers, there is a large temperature dependence in the resistances induced by measurement. As a consequence, simply dealing with these resistances through the use of some sort of offset does not yield an accurate temperature measurement at a variety of temperatures, and therefore the overall system accuracy of a temperature system suffers. A further problem exists in that some portions of the error term are non-obvious, and thus hard to identify.

There are also well-known techniques for dynamically canceling the effects of this series resistance on a real time basis. These techniques are only suitable for cases when the sensing junction is an actual diode or a transistor that substantially behaves like a diode, i.e. has high and constant current gain. For the small geometry processes it has been shown that the temperature sensing transistors do not behave like simple diodes, hence making these dynamic resistance correction techniques largely useless.

SUMMARY

An embodiment of the present invention is directed to a method for reducing the effects of temperature coefficients of series resistance in a temperature sensing circuit having a temperature sensing element. The currents through the temperature sensing element are relatively constant over temperature. The method includes adjusting the gain of an analog to digital converter to compensate for the change in current densities in the temperature sensing element multiplied by a characterized temperature coefficient of the series resistance of a signal path of the temperature sensing circuit. The method also includes adjusting an offset of the analog to digital converter to compensate for the change in current densities in the temperature sensing element multiplied by a characterized resistance of the signal path of the temperature sensing circuit.

BRIEF DESCRIPTION OF THE DRAWINGS

FIG. 3 shows a flowchart for a method for reducing the effects of temperature coefficients in a temperature sensing circuit in accordance with an embodiment of the present invention.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the claims. Furthermore, in the detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Figure 1:
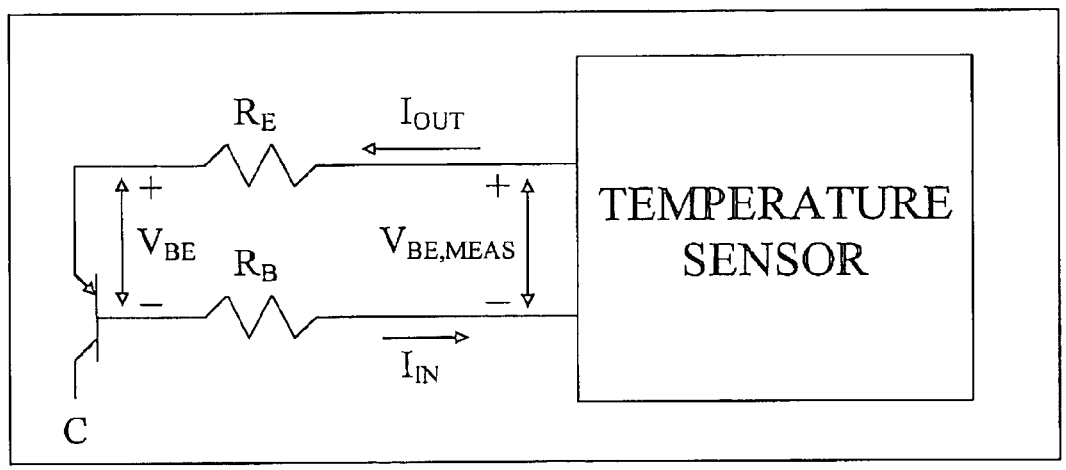
FIG. 1 illustrates one temperature measuring circuit that experiences this problem of measurement-induced error.

Briefly stated, embodiments of the present invention are directed to a method for reducing the effects of temperature coefficients of series resistance in temperature sensing circuits. The series resistance on the signal path of temperature sensors can be a significant error term if it is not treated properly. FIG. 1 shows a typical remote temperature sensor 100 with a PNP Sensing Element. It should be appreciated that the embodiments disclosed herein are similarly applicable to other sensing elements such as NPN transistors or junction diodes or others. The sensing element can also be integrated on the target device or it can be a discrete device.

The temperature sensor 100 in FIG. 1 can be a standard diode mode temperature sensor such as LM86 or preferably a "transistor mode" temperature sensor such as LM95231/LM95235 with TruTherm™ technology. Also the collector of the PNP transistor in FIG. 1 may be connected to its base or another bias node such as ground. In each of these cases the temperature sensor measures temperature of the sensing junction by applying two or more different currents to the sensing junction and measuring the change in the base-emitter voltage ($\Delta V_{BE}$). However, due to the series resistances in the measurement path, the measured base-emitter voltage is different from the actual base-emitter voltage. The following equations show the relationship between the measured base-emitter voltage change and the temperature of the sensing junction for the example in FIG. 1. Similar equations can be written for other cases.

First, in the case of diode mode sensors where the collector is connected to a bias such as ground, the actual $\Delta V_{BE}$ is approximated by using the emitter current ratios, where $I_{OUT}$ is equal to the emitter current and $I_{IN}$ is equal to the base current. The difference in base-emitter voltage is measured by using two currents $I_{EN}$ and $I_{E1}$, where they have a well defined ratio $N \equiv I_{EN}/I_{E1}$:

$$\Delta V_{BE,meas} = \eta \frac{kT}{q} \times \ln\left(\frac{I_{EN}}{I_{E1}}\right) + R_E \times (I_{EN} - I_{E1}) + R_B \times (I_{BN} - I_{B1}) \quad (3)$$

In the case of diode mode sensors where the collector is shorted to the base, the actual $\Delta V_{BE}$ is approximated by using the emitter current ratios, where $I_{OUT}$ is equal to the emitter current and $I_{IN}$ is equal to the sum of the base current and the collector current, which is also equal to the emitter current. The difference in base-emitter voltage is measured by using two currents $I_{EN}$ and $I_{E1}$, where they have a well defined ratio $N \equiv I_{EN}/I_{E1}$:

$$\Delta V_{BE,meas} = \eta \frac{kT}{q} \times \ln\left(\frac{I_{EN}}{I_{E1}}\right) + (R_E + R_B) \times (I_{EN} - I_{E1}) \quad (4)$$

In the case of transistor mode sensors where the collector is connected to a bias such as ground, the actual $\Delta V_{BE}$ is calculated by using the collector current ratios, where $I_{OUT}$ is equal to the emitter current and $I_{IN}$ is equal to the base current. The difference in base-emitter voltage is measured by using two currents $I_{EN}$ and $I_{E1}$, where they define a well controlled collector current ratio $N \equiv I_{CN}/I_{C1}$:

$$\Delta V_{BE,meas} = \eta \frac{kT}{q} \times \ln\left(\frac{I_{CN}}{I_{C1}}\right) + R_E \times (I_{EN} - I_{E1}) + R_B \times (I_{BN} - I_{B1}) \quad (5)$$

Finally, in a less practical configuration, for transistor mode sensors where the collector is shorted to the base and where the collector current ratio can be controlled or measured, the actual $\Delta V_{BE}$ is calculated by using the collector current ratios, where $I_{OUT}$ is equal to the emitter current and $I_{IN}$ is equal to the sum of the base current and the collector current, which is also equal to the emitter current. The difference in base-emitter voltage is measured by using two currents $I_{EN}$ and $I_{E1}$, where they define a well controlled collector current ratio $N \equiv I_{CN}/I_{C1}$:

$$\Delta V_{BE,meas} = \eta \frac{kT}{q} \times \ln\left(\frac{I_{CN}}{I_{C1}}\right) + (R_E + R_B) \times (I_{EN} - I_{E1}) \quad (6)$$

In any of the above cases as well as other junction types such as NPNs or diodes, the equations can be simplified to the following form:

$$\Delta V_{BE,meas} = \eta \frac{kT}{q} \times \ln(N) + R_{EQ} \times \Delta I_E \quad (7)$$

In the above equation, the first term represents a linear relationship between temperature and the $\Delta V_{BE,meas}$, which can be exploited to calculate the temperature of the sensing element by measuring this voltage. In most cases the measured voltage is processed by an ADC or optional signal conditioners and the temperature is represented in digital form.

The second term in the equation above has generally been either ignored or treated as an offset by the existing sensors. Some sensors specify a typical $\Delta I_E$ for the end user to use with a typical resistance to calculate a system wide offset and use in an offset register. Some other sensors trim the ADC offset at the factory to compensate for the effects of the series resistance.

The shortcoming of the prior art has been that it ignored the temperature coefficients of the series resistance, $R_{EQ}$. In older generation processes the effective temperature coefficient of the effective series resistance has been generally low. The temperature sensors also have utilized current sources that had relatively small temperature coefficients. However in new generations of processors the temperature coefficient of the series resistance is not negligible and must be accounted for.

To account for the temperature coefficients of the series resistance we refer to the following equation:

$$R_{EQ} = R_{EQo} \times (1 + (T - T_o) \times C) \quad (8)$$

where C is the temperature coefficient of the equivalent resistor, $T_o$ is the reference temperature and $R_{EQo}$ is the equivalent resistance at the reference temperature. This equation can be simplified as follows:

$$R_{EQ} = R + \alpha \times T \quad (9)$$

where R and α are relatively constant over temperature and α represents the effective temperature coefficient of the equivalent resistance.

Prior to accounting for the effects of the temperature coefficient of the series resistance, the part containing the temperature sensing circuit must be characterized in order to extrapolate what both R and α look like. The characterization is performed by running a series of tests on the temperature sensing circuit and fitting the results to a curve. This process of characterization, and an example thereof, can be found in the spreadsheet attached as Appendices A-E. This spreadsheet for calculating values for the temperature sensing circuit relies on macros to automatically perform calculations and operations in response to data that is input prior to initiating the macros. The exemplary spreadsheet attached shows data for one sensing junction. This is enough to demonstrate how the technique and the spreadsheet work. It should be appreciated that data can also be calculated for multiple sensing junctions. The goal of this exemplary spreadsheet is to optimize the RMS error in cell K17 of the spreadsheet utilizing a solver function that is built in to Microsoft Excel. After the RMS error is optimized, a macro is then used to calculate values that will set the averages on column J to zero. The macro is initiated with the shortcut CTRL+T.

One embodiment is directed to a method for reducing the effects of temperature coefficients of series resistance in a temperature sensing circuit where the currents through the temperature sensing element are calibrated to be relatively constant over temperature. In other words, $I_1$ and $I_N$ at $T_1$ are substantially equal to $I_1$ and $I_N$ at $T_2$. Maintaining constant currents over temperature is preferred because both gain error and offset error depend on $\Delta I_E$, so maintaining a constant $\Delta I_E$ reduces the number of unknowns that must be dealt with, as will be apparent from the discussion below. Diode mode sensors by their very nature have well-controlled $I_E$ values. Since for transistor mode temperature sensors the important currents are usually the collector currents, the emitter currents are not always well controlled. A calibration algorithm for the emitter currents is recommended for the transistor mode temperature sensors. One option is to calibrate the value of $I_{EN}$ as described in the TruTherm™ application. Another option is to calibrate the value of $I_{EN} - I_{E1}$ by employing a feedback circuit that applies two target collector currents, measures their corresponding emitter currents, and checks the measured $\Delta I_E$ against a desired $\Delta I_E$. If the measured result is not equal to the desired result, the feedback circuit will adjust the collector currents accordingly. In a preferred embodiment, the configuration includes a PNP sensing element with its collector grounded and a TruTherm™ temperature sensor in transistor mode, with current sources that are relatively constant over temperature.

Figure 2:
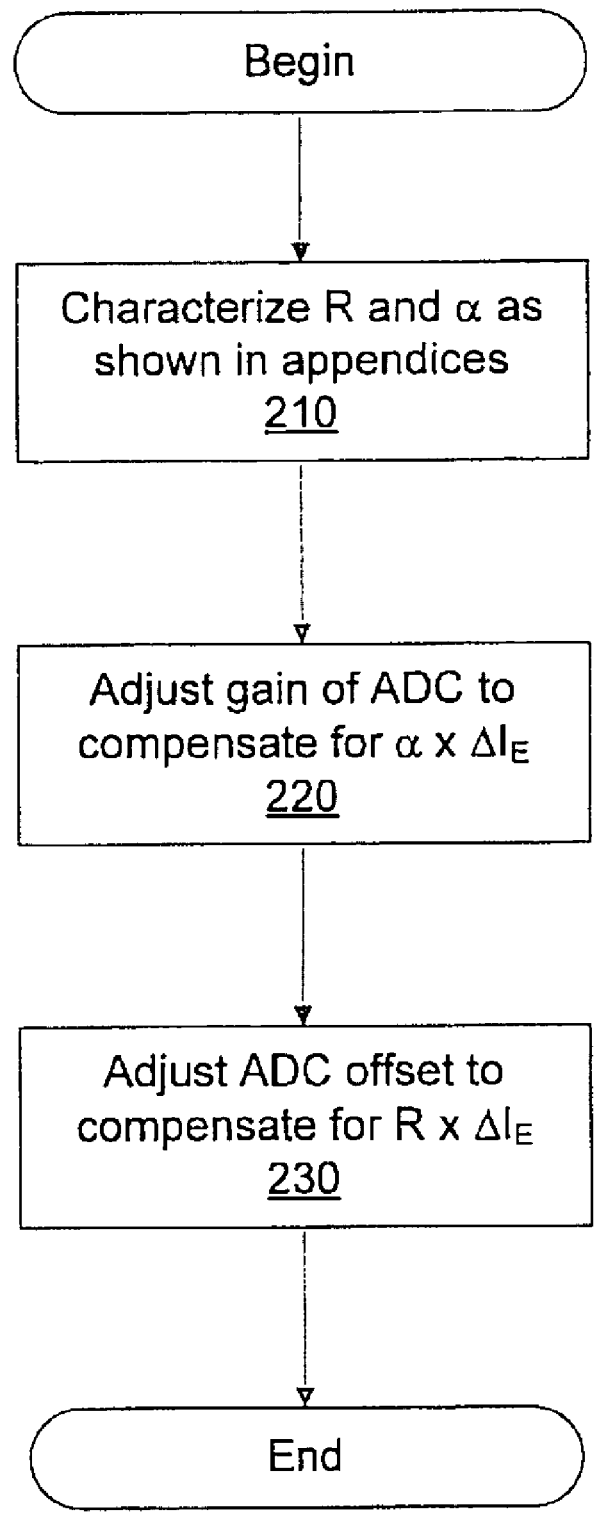
FIG. 2 shows a flowchart for a method for calibrating emitter currents through a temperature sensing element, in accordance with an embodiment of the present invention.

FIG. 2 is a flowchart illustrating a method for reducing the effects of temperature coefficients of series resistance in a temperature sensing circuit where the currents through the temperature sensing element are calibrated to be relatively constant over temperature, in accordance with an embodiment of the present invention. In this case, the measured base-emitter voltage difference can be expressed as:

$$\Delta V_{BE,meas} = \underbrace{\left[\eta \frac{k}{q} \times \ln(N) + \alpha \times \Delta I_E\right] \times T}_{Gain} + \underbrace{R \times \Delta I_E}_{Offset} \quad (10)$$

At step 210, R and α are characterized as shown in Appendices A-E. Once R and a have been characterized, the effects of the temperature coefficient of the series resistance can be eliminated first by adjusting the gain of the temperature sensing circuit's analog-to-digital converter (ADC) to compensate for the effects of $\alpha \times \Delta I_E$ (step 220). Next, the effects of $R \times \Delta I_E$ are compensated for by adjusting the offset of the ADC accordingly (step 230).

Other embodiments are directed to a method for reducing the effects of temperature coefficients of series resistance in a temperature sensing circuit where the currents through the temperature sensing element are not necessarily constant over temperature. In these cases the $\Delta I_E$ term can be expressed as: $\Delta I_E = \Delta I_{Eo} + \beta \times T$ where $\Delta I_{Eo}$ and β are relatively constant over temperature and β represents the effective temperature coefficient of the current sources. Thus:

$$R_{EQ} \times \Delta I_E = (R + \alpha \times T) \times (\Delta I_{Eo} + \beta \times T) \quad (11)$$

$$= R \times \Delta I_{Eo} + \underbrace{(\beta \times R + \alpha \times \Delta I_{Eo}) \times T}_{\gamma} + \underbrace{\alpha \beta \times T^2}_{negligible}$$

The last term in Equation 11 is negligible in most applications. Rewriting the measured base-emitter voltage difference we get:

$$\Delta V_{BE,meas} = \underbrace{\left[\eta\frac{k}{q} \times \ln(N) + \gamma\right] \times T}_{Gain} + \underbrace{R \times \Delta I_{Eo}}_{Offset} \quad (12)$$

FIG. 3 is a flowchart illustrating a method for reducing the effects of temperature coefficients of series resistance in a temperature sensing circuit, in accordance with an embodiment of the present invention. The temperature sensing circuit using the method shown in FIG. 3 does not require that the currents be relatively constant over temperature. At step 310, R and α are characterized as shown in Appendices A-E. Once the parameters R and α (and thus γ) have been characterized, the effects of the temperature coefficient of the series resistance can be eliminated accurately by matching temperature coefficients. At step 320, a current source having a particular β is chosen. At step 330, a $\Delta I_{Eo}$ is then chosen such that γ is equal to zero. At step 340, the effects of $R \times \Delta I_{Eo}$ are then cancelled by adjusting the ADC offset accordingly.

Figure 4:
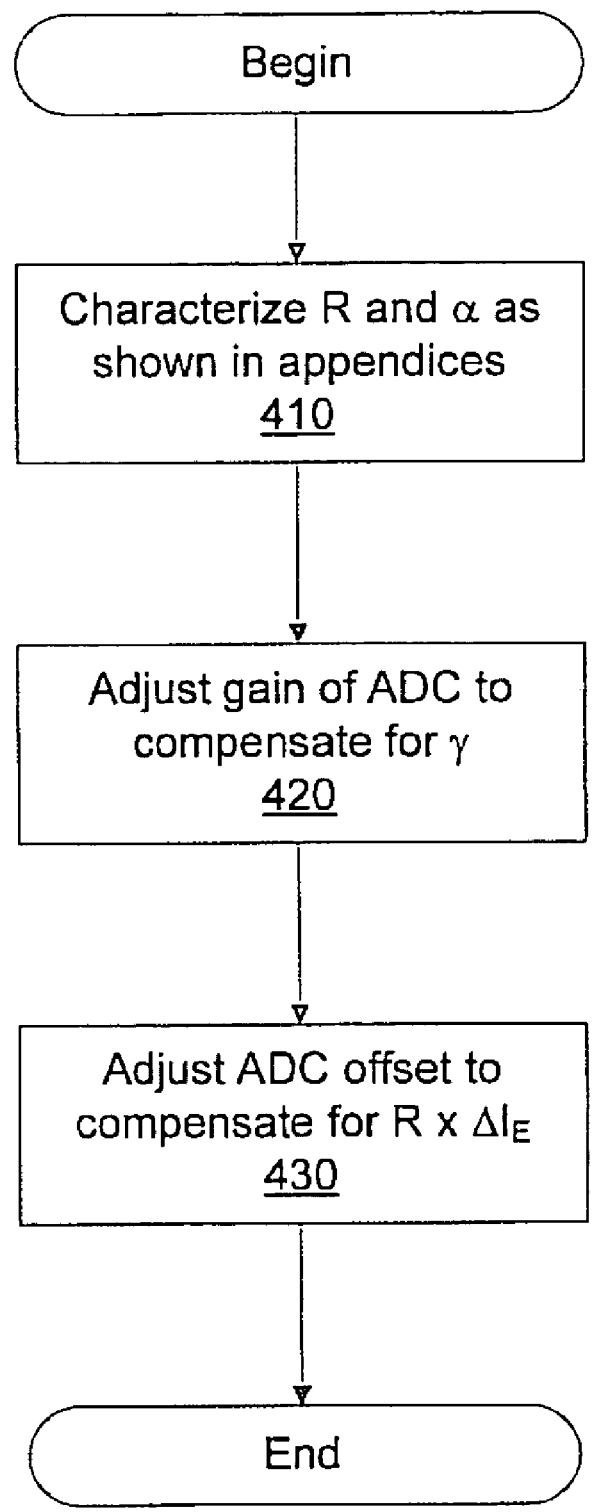
FIG. 4 shows a flowchart for a method for reducing the effects of temperature coefficients in a temperature sensing circuit in accordance with another embodiment of the present invention.

FIG. 4 shows a flowchart illustrating a method for reducing the effects of temperature coefficients of series resistance in a temperature sensing circuit, in accordance with an embodiment of the present invention. At step 410, R and α are characterized as shown in Appendices A-E. Once the parameters R and α (and thus γ) have been characterized, the effects of the temperature coefficient of the series resistance are eliminated accurately by adjusting the ADC characteristics. At step 420, the gain of the ADC is adjusted to compensate for the effects of γ. At step 430, the ADC offset is adjusted accordingly to compensate for the effects of $R \times \Delta I_{Eo}$.

It should be appreciated that the gain and offset adjustments in the above-mentioned embodiments can be made at the factory on a per-design basis, at the factory for each part individually, at the system level in software, or any combination of the above means. It should also be appreciated that in addition to compensating for temperature coefficients, gain adjustments can also include, but are not necessarily limited to, compensating for variations in non-ideality (η), compensating for variations in current ratios (N), and compensating for ADC gain errors. Further, it is appreciated that Offset adjustments can include but are not limited to compensating for other parasitic resistors, such as board resistance, correcting ADC offsets, and any other small gain errors in limited temperature ranges.

Thus, embodiments of the present invention provide multiple methods for reducing the effects of temperature coefficients of line resistance in temperature sensors. By accurately characterizing and accounting for this error, the accuracy of a temperature sensor will improve dramatically. For example, some experiments implementing an embodiment have yielded a four-fold improvement in accuracy.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for reducing the effects of temperature coefficients of series resistance in a temperature sensing circuit having a temperature sensing element, wherein the currents through the temperature sensing element are relatively constant over temperature, the method comprising:
    adjusting a gain of an analog to digital converter to compensate for the change in current densities in the temperature sensing element multiplied by a characterized temperature coefficient of a series resistance of a signal path of the temperature sensing circuit; and
    adjusting an offset of the analog to digital converter to compensate for the change in current densities in the temperature sensing element multiplied by a characterized resistance of the signal path of the temperature sensing circuit.

2. The method as recited in claim 1 wherein the temperature sensing element comprises a PNP bipolar junction transistor.

3. The method as recited in claim 1 wherein the temperature sensing element comprises an NPN bipolar junction transistor.

4. The method as recited in claim 1 wherein the temperature sensing element comprises a diode.

5. The method as recited in claim 1 wherein the temperature sensor is a diode mode sensor.

6. The method as recited in claim 1 wherein the temperature sensor is a transistor mode sensor.

7. The method as recited in claim 1 wherein temperature is measured in an integrated circuit fabricated using a 65 nanometer manufacturing technology.

8. A method for reducing the effects of temperature coefficients of series resistance in a temperature sensing circuit, the method comprising:
    selecting a current source having a particular temperature coefficient;
    selecting a particular change in current densities through the temperature sensing element such that the product of the temperature coefficient of the current source and a characterized resistance of the signal path of the temperature sensing circuit plus the product of the change in current densities and a characterized temperature coefficient of a series resistance of a signal path of the temperature sensing circuit is zero; and
    adjusting an offset of an analog to digital converter to compensate for the change in current densities in the temperature sensing element multiplied by the characterized resistance of the signal path of the temperature sensing circuit.

9. The method as recited in claim 8 wherein the temperature sensing element comprises a PNP bipolar junction transistor.

10. The method as recited in claim 8 wherein the temperature sensing element comprises an NPN bipolar junction transistor.

11. The method as recited in claim 8 wherein the temperature sensing element comprises a diode.

12. The method as recited in claim 8 wherein the temperature sensor is a diode mode sensor.

13. The method as recited in claim 8 wherein the temperature sensor is a transistor mode sensor.

14. The method as recited in claim 8 wherein temperature is measured in an integrated circuit fabricated using a 65 nanometer manufacturing technology.

15. A method for reducing the effects of temperature coefficients of series resistance in a temperature sensing circuit, the method comprising:
adjusting a gain of an analog to digital converter to compensate for the product of a temperature coefficient of a current source of the temperature sensing circuit and a characterized resistance of the signal path of the temperature sensing circuit plus the product of a change in current densities and a characterized temperature coefficient of a series resistance of a signal path of the temperature sensing circuit; and
adjusting an offset of the analog to digital converter to compensate for the change in current densities in the temperature sensing element multiplied by the characterized resistance of the signal path of the temperature sensing circuit.

16. The method as recited in claim 15 wherein the temperature sensing element comprises a PNP bipolar junction transistor.

17. The method as recited in claim 15 wherein the temperature sensing element comprises an NPN bipolar junction transistor.

18. The method as recited in claim 15 wherein the temperature sensing element comprises a diode.

19. The method as recited in claim 15 wherein the temperature sensor is a diode mode sensor.

20. The method as recited in claim 15 wherein the temperature sensor is a transistor mode sensor.

21. The method as recited in claim 15 wherein temperature is measured in an integrated circuit fabricated using a 65 nanometer manufacturing technology.

* * * * *